W. VOM HOFE.
Bottle-Stopper.

No. 167,141. Patented Aug. 24, 1875.

Witnesses.
Otto Hufeland.
Chas. Wahlers.

Inventor.
William Vom Hofe
pr
Van Santvoord & Hauff
Attrs

UNITED STATES PATENT OFFICE.

WILLIAM VOM HOFE, OF NEW YORK, N. Y.

IMPROVEMENT IN BOTTLE-STOPPERS.

Specification forming part of Letters Patent No. 167,141, dated August 24, 1875; application filed July 30, 1875.

*To all whom it may concern:*

Be it known that I, WILLIAM VOM HOFE, of the city, county, and State of New York, have invented a new and Improved Bottle-Stopper, which invention is fully set forth in the following specification, reference being had to the accompanying drawing, in which—

Figure 1:
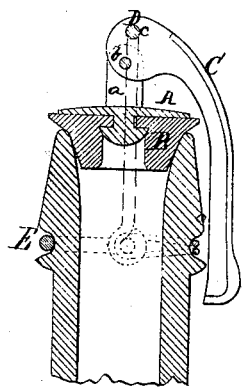
Figure 2:
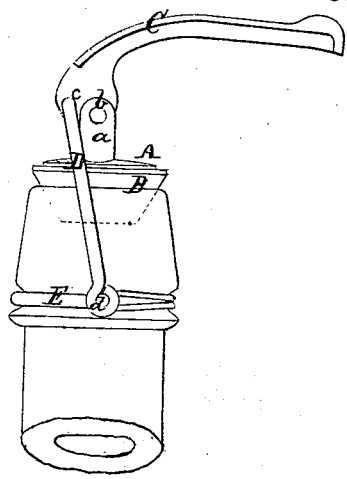
Figure 3:
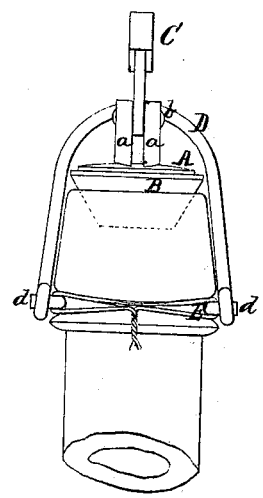

Figure 1 represents a vertical section when the bottle is closed. Fig. 2 is a side view when the stopper is loose. Fig. 3 is a front view of the same.

Similar letters indicate corresponding parts.

This invention relates to an improvement on that class of bottle-stoppers which I have described in my Patent No. 163,553, dated May 18, 1875.

My present improvement consists in a metallic plate, which is connected on one side to a flanged stopper, while from its other side rise two lugs carrying a fixed pin, which forms the fulcrum for a lever, that connects with a bail, which swings on pivots projecting from a band that is connected to the neck of the bottle, so that when the stopper is placed in the mouth of the bottle, and the lever is depressed, the bail is caused to swing over the fulcrum-pin of said lever, and thereby the stopper is firmly depressed into the mouth of the bottle, and at the same time, as soon as the bail has passed across the fulcrum-pin, the lever is securely retained in its locking position. When the lever is raised the bail forms the fulcrum, and the stopper can be easily withdrawn and lifted off from the mouth of the bottle.

In the drawing, the letter A designates a metal plate, to one side of which is secured a stopper, B, which is, by preference, made of vulcanized india-rubber, but which may be made of any material suitable for this purpose. From the opposite side of the plate A rise two lugs, *a a*, in which is secured a fixed pin, *b*, that forms the fulcrum for a lever, C. This lever is provided with a hole, *c*, through which extends the bail D, which swings on pivots *d*, projecting from a band, E, which is fastened round the neck of the bottle.

When the stopper is placed on the mouth of the bottle, and the lever C is depressed to the position shown in Fig. 1, the bail D is caused to swing over the lugs *a a* of the plate A, and the stopper is depressed into the mouth of the bottle with considerable force; and as soon as the bail has swung beyond the fulcrum-pin *b* of the lever C, the free end of said lever is pressed inward toward the neck of the bottle, and it is securely retained in position.

If the bottle is filled with a liquid charged with a gas under pressure, the internal pressure, instead of having a tendency to force the lever out of its locking position, serves to lock said lever with increased force, and the stopper is not liable to be forced out of the mouth of the bottle until the lever is raised.

When the lever is raised from the position shown in Fig. 1 to that shown in Fig. 2 the bail is caused to swing back over the lugs *a a* of the plate A, and then said bail forms the fulcrum for the lever, so that the stopper can be easily withdrawn from the mouth of the bottle in case it should have become firmly wedged in the same, and by means of the bail the stopper can be swung back away from the mouth of the bottle, so that said bottle can be readily emptied, and also cleaned without obstruction.

It will be noticed that the stopper B is made in the form of an obtuse cone, so that when the same is placed on the mouth of a bottle it bears on the top edge without touching the inner walls of the mouth, and when the stopper is depressed it spreads out over the top edge of the mouth, and forms a spring, whereby the lever C is retained in its locking position.

What I claim as new, and desire to secure by Letters Patent, is—

The lever C, provided with two round holes, one to receive the fixed pin *b*, and the other to receive the bail D, in combination with a plate, A, which carries the stopper B, and is provided with lugs *a*, supporting the pin *b*, and with a neck-band, E, provided with pivots *d*, on which the bail swings, all constructed and operating substantially in the manner herein described.

In testimony that I claim the foregoing I have hereunto set my hand and seal this 29th day of July, 1875.

WILLIAM VOM HOFE. [L. S.]

Witnesses:
 W. HAUFF,
 E. F. KASTENHUBER.